United States Patent [19]

Sakakiyama

[11] Patent Number: 4,829,852
[45] Date of Patent: May 16, 1989

[54] CONTROL SYSTEM FOR AN AUTOMATIC TRANSMISSION
[75] Inventor: Ryuzo Sakakiyama, Tokyo, Japan
[73] Assignee: Fuji Jukogyo Kabushiki Kaisha, Tokyo, Japan
[21] Appl. No.: 163,053
[22] Filed: Mar. 2, 1988
[30] Foreign Application Priority Data Mar. 4, 1987 [JP] Japan .................................. 62-50748

[51] Int. Cl.$^4$ ............................................ B60K 41/18
[52] U.S. Cl. ......................................... 74/866; 74/878
[58] Field of Search ................................. 74/866, 878

[56] References Cited

U.S. PATENT DOCUMENTS

| | | | |
|---|---|---|---|
| 4,079,638 | 3/1978 | Sibend | 74/866 |
| 4,463,427 | 7/1984 | Bonnetain et al. | 74/866 X |
| 4,539,868 | 9/1985 | Habn | 74/866 X |
| 4,631,984 | 12/1986 | Jones | 74/878 |

FOREIGN PATENT DOCUMENTS

| | | | |
|---|---|---|---|
| 51-54160 | 5/1976 | Japan . | |
| 0098248 | 6/1985 | Japan | 74/866 |
| 0037555 | 2/1987 | Japan | 74/866 |

Primary Examiner—Dirk Wright
Attorney, Agent, or Firm—Martin A. Farber

[57] ABSTRACT

A control system for an automatic transmission having a first gear hold range, and a second gear hold range. A detector is provided for detecting a selected gear hold range and for producing a gear hold signal, and a sensing device is provided for producing an engine speed signal dependent on engine speed. When the engine speed signal exceeds a predetermined speed under the selection of one of gear hold ranges, the gear hold range is released and transmission is upshifted.

3 Claims, 5 Drawing Sheets

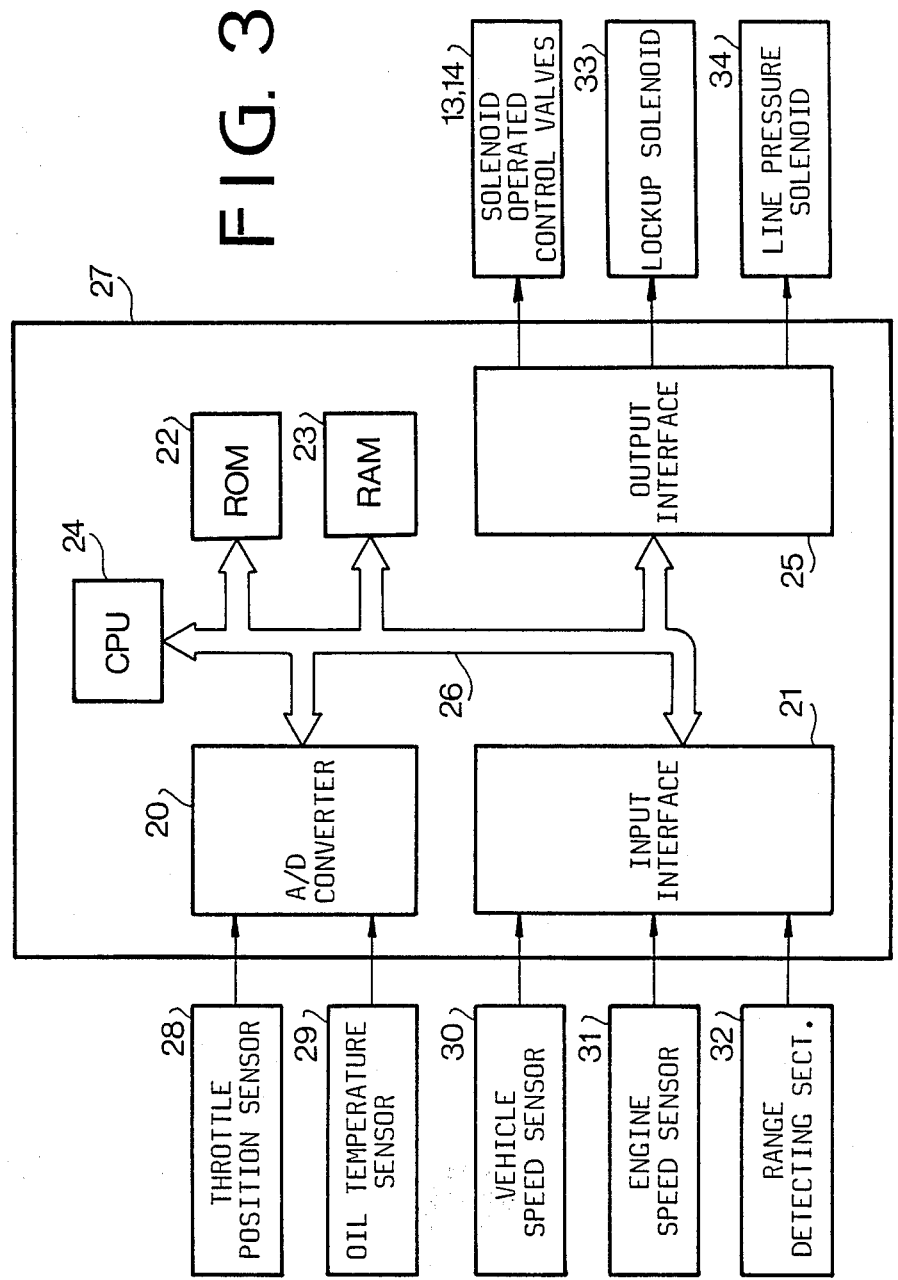

CONTROL SYSTEM FOR AN AUTOMATIC TRANSMISSION

BACKGROUND OF THE INVENTION

The present invention relates to a control system for an automatic transmission for motor vehicles.

The automatic transmission for the vehicle operates automatically to provide a suitable gear ratio in accordance with vehicle speed and opening degree of a throttle valve of the engine. Further in such a transmission, a hold range including a first gear hold and a second gear hold is provided to hold the gear ratio in the first speed or second speed in order to ensure the power of the engine at uphill climbing or to effect the engine braking at deceleration of the vehicle. If the vehicle speed is accelerated in gear hold state, the engine speed is excessively increased, because of the large gear ratio.

Such a high engine speed may cause failure of the engine. In order to prevent such a trouble, a system is known in which a transmission is forcibly upshifted to prevent the engine from increasing to excessive speed, when the vehicle speed exceeds a predetermined value in the gear hold state.

On the other hand, Japanese Patent Application Laid-Open No. 51-54160 discloses a system in which actual transmission ratio is detected in accordance with the engine speed and the vehicle speed, an an optimum timing for changing the transmission ratio is obtained in accordance with the actual transmission ratio and detected engine speed or vehicle speed.

However, in conventional systems, since the excessive engine speed is detected based on the vehicle speed without considering other influences such as slip of a torque converter, inaccurate detection is liable to occur.

SUMMARY OF THE INVENTION

The object of the present invention is to provide a control system for an automatic transmission which may exactly prevent excessive engine speed in gear hold states of the automatic transmission.

According to the present invention, there is provided a control system for an automatic transmission for a motor vehicle driven by an engine, the automatic transmission having a gear hold range. The control system comprises detector means for detecting a selected gear hold range and for producing a gear hold signal, sensing means for detecting engine speed and for producing an engine speed signal dependent on engine speed, deciding means for producing an excessive engine speed signal when the detected engine speed exceeds a predetermined speed, control means responsive to the gear hold signal and to the excessive engine speed signal for releasing the gear hold range and for upshifting the transmission. The gear hold range includes a first gear hold range and a second gear hold range, and the control means includes at least one shift valve having a spool, and a solenoid operated valve for shifting the spool for holding a selected gear.

The other objects and features of this invention will be apparently understood from the following description with reference to the accompanying drawings.

BRIEF DESCRIPTION OF DRAWINGS

FIG. 3 is a block diagram showing a control unit of the present invention; and

DETAILED DESCRIPTION OF THE PREFERRED EMBODIMENT

Figure 1:
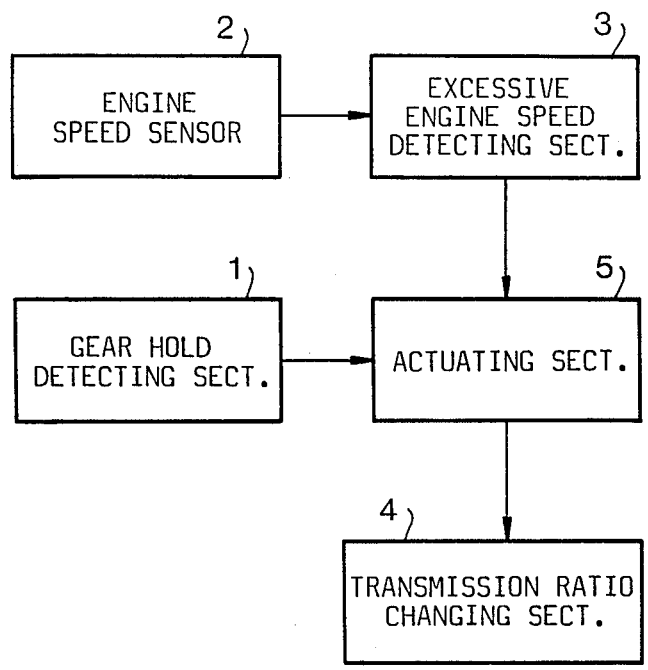
FIG. 1 is a block diagram of a control system according to the present invention.

FIG. 1 shows a principle of the present invention. A gear hold range detecting section 1 is provided for producing an output signal when a first gear hold range or a second gear hold range is selected. The output signal is applied to an actuating section 5. An engine speed sensor 2 produces an engine speed signal which is applied to an excessive engine speed deciding section 3. When the engine speed exceeds a predetermined high value, the deciding section 3 produces a high engine speed signal which is applied to the actuating section 5. In accordance with these signals from the detecting section 1 and the deciding section 3, the actuating section 5 operates to upshift at a transmission ratio changing section 4 to reduce the engine speed.

Figure 2A:
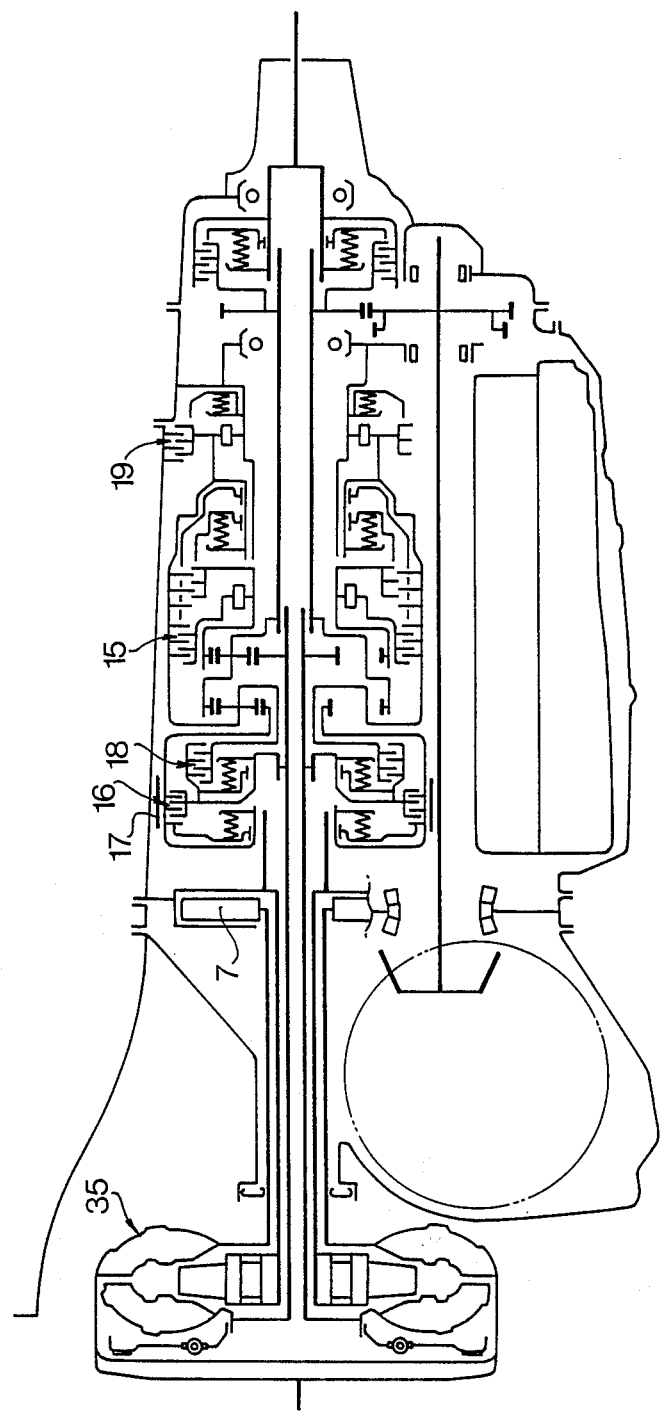
FIGS. 2a and 2b show an automatic transmission and a hydraulic control circuit of the invention.
Figure 2B:
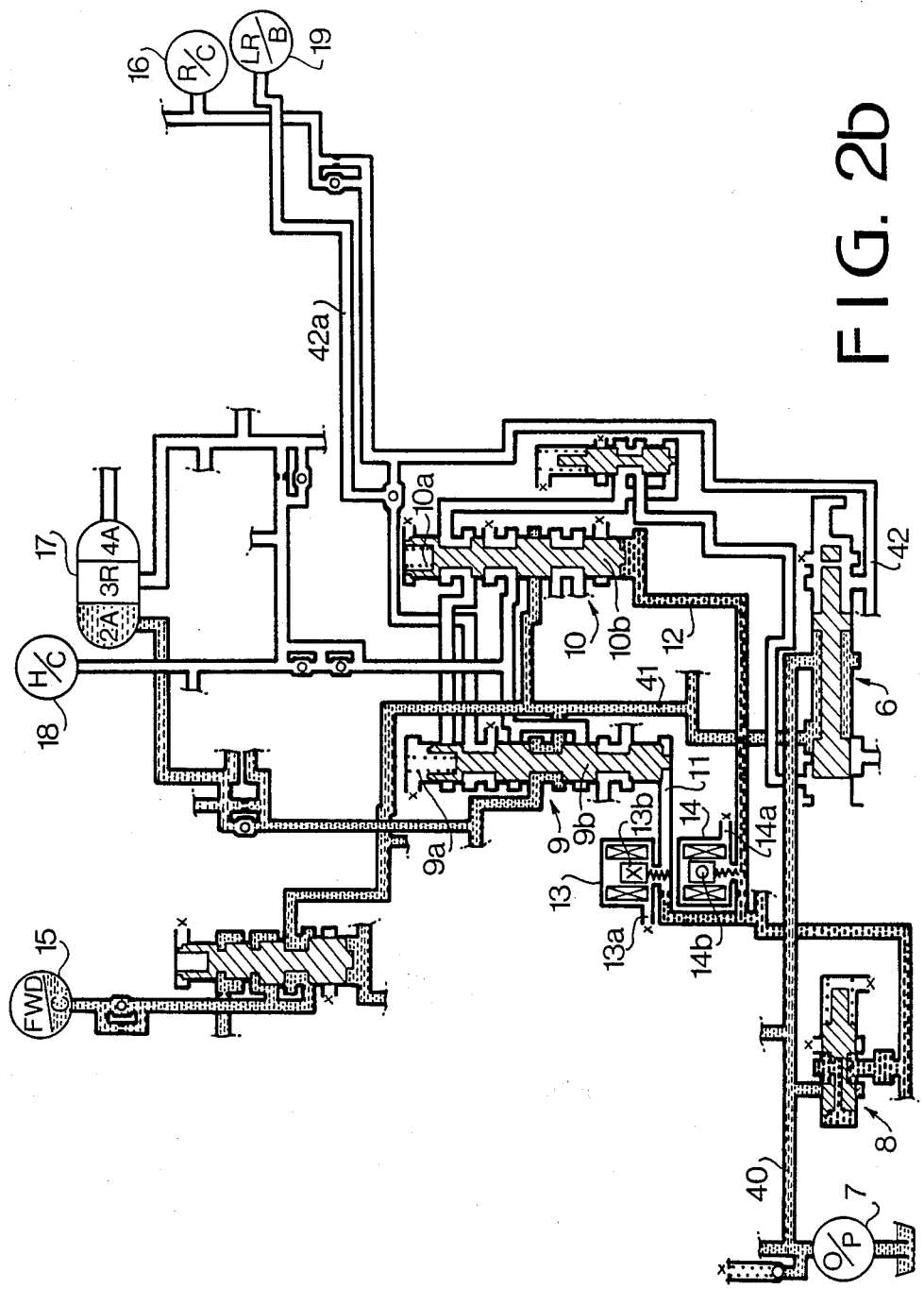

Referring to FIGS. 2a and 2b showing an automatic transmission and a hydraulic control circuit of the automatic transmission, oil supplied from an oil pump 7 is regulated by a pressure regulator valve (not shown) to produce line pressure which is applied to a manual shift valve 6 through a line pressure conduit 40. The manual valve 6 is operated by a selector lever (not shown) mechanically connected thereto to change the operational range of the automatic transmission. The line pressure is also applied to a pilot valve 8 for producing pressurized oil from a part of the line pressure which is applied to shift valves 9 and 10 through conduits 11 and 12, respectively. Solenoid operated control valves 13 and 14 are communicated with conduits 11 and 12 respectively at upstream of shift valves 9 and 10 so as to control draining of the oil. The manual valve 6 is communicated with shift valves 9 and 10 through a conduit 41. The line pressure in the conduit 41 is further applied to a forward clutch 15. The manual valve 6 supplies the line pressure to a reverse clutch 16 through a conduit 42 and a low and reverse brake 19 by conduits 42 and 42a. The manual valve 6 is further connected to a brake band 17, high clutch 18, and low and reverse brake 19 through shift valves 9 and 10 to supply the line pressure.

In a reverse range, the line pressure from the manual valve 6 is applied to the reverse clutch 16 and the low and reverse brake 19. In the drive range or the hold range for first gear hold or second gear hold, the line pressure is applied to the forward clutch 15 and shift valves 9 and 10.

Each of the shift valves 9 and 10 is a two-position shift valve which is operated by respective solenoid operated control valves 13 and 14. The solenoid operated control valves 13 and 14 are operated by output signals from the control unit 5 which will described hereinafter. When the control valve 13 is de-energized, a valve 13b opens a drain port 13a to drain the oil of the conduit 11. Thus, a spool 9b of the shift valve 9 is urged by a return spring 9a to a first position. When the control valve 13 is energized, the valve 13b closes the drain port 13a. Thus, a sufficient pressurized oil from the valve 8 is applied to the shift valve 9 to shift the spool 9b to a second position.

The shift valve 10 and the solenoid operated control valve 14 are substantially the same as valves 9 and 13 in constructions and operations, respectively.

In the drive range, the line pressure of the manual valve 6 is supplied to the forward clutch 15. The transmission range from the first-speed drive condition to the fourth-speed drive condition is established. A following table 1 shows operations of the brake band 17, high clutch 18, low and reverse brake 19, solenoid operated control valves 13 and 14, and shift valves 9 and 10.

TABLE 1

| | | | | |
|---|---|---|---|---|
| SOLENOID OPERATED CONTROL VALVE 13 | ON | OFF | OFF | ON |
| SOLENOID OPERATED CONTROL VALVE 14 | ON | ON | OFF | OFF |
| SHIFT VALVE 9 | SECOND POSITION | FIRST POSITION | FIRST POSITION | SECOND POSITION |
| SHIFT VALVE 10 | SECOND POSITION | SECOND POSITION | FIRST POSITION | FIRST POSITION |
| BRAKE BAND 17 | — | OPERATED | OPERATED | — |
| HIGH CLUTCH 18 | — | — | OPERATED | OPERATED |
| LOW AND REVERSE BRAKE 19 | OPERATED | — | — | — |
| | 1ST-SPEED | 2ND-SPEED | 3RD-SPEED | 4TH-SPEED |

When both the control valves 13 and 14 are energized, both the spools 9b and 10b of shift valves 9 and 10 are at second positions, so that the line pressure is applied to the low and reverse brake 19 to provide the first-speed drive condition.

When the control valve 13 is de-energized to hold the spool 9b of the shift valve 9 at the first position and the control valve 14 is energized to shift the spool 10b of the shift valve 10 to the second position (FIG. 2), the line pressure is applied to the brake band 17 to clamp it. Thus, the second-speed drive condition is obtained.

When both the control valves 13 and 14 are de-energized, both the spools 9b and 10b of shifrt valves 9 and 10 are held at first positions, so that the line pressure is applied to the brake band 17 and high clutch 18 to establish the third-speed drive condition.

When the control valve 13 is energized to shift the spool 9b of the shift valve 9 to the second position, and the control valve 14 is de-energized to hold the spool 10b of the shift valve 10 at the first position, the line pressure is applied to the high clutch 18, thereby providing the fourth-speed drive condition.

Referring to FIG. 3 showing a control circuit for controlling the solenoid operated control valves 13 and 14, an electronic control unit 27 comprising a michrocomputer has an A/D converter 20, an input interface 21, a read only memory (ROM) 22, a random access memory (RAM) 23, a central processor unit (CPU) 24, and output interface 25. These elements are connected to each other through a bus line 26. The control unit 27 operates in accordance with program stored in the ROM 22. Further, the control unit 27 controls the hydraulic control circuit of the transmission.

The A/D converter 20 is supplied with signals from a throttle position sensor 28 and an ATF oil temperature sensor 29 for sensing temperature of oil in the transmission. The input interface 21 is applied with signals from a vehicle speed sensor 30, an engine speed sensor 31, and a range detecting section 32 for producing a selected transmission range signal. The output interface 25 produces signals which are fed to solenoid operated control valves 13 and 14 and other solenoid operated valve 33 for locking up a torque converter 35 and valve 34 for regulating the line pressure.

Figure 4:
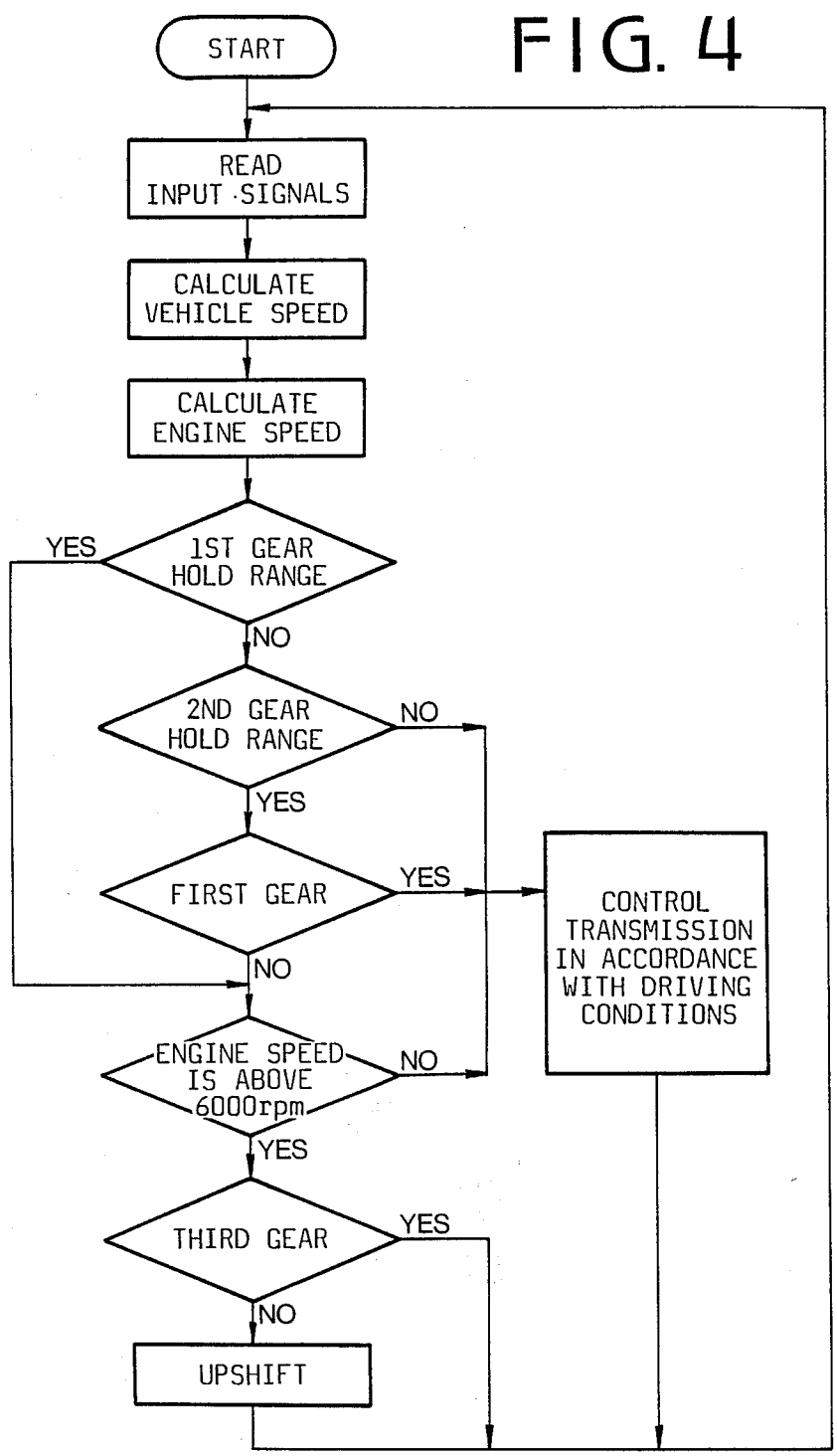
FIG. 4 is a flow chart showing operation of the control unit.

FIG. 4 shows the operation of the control unit 27. The signals from sensors 28, 29, 30, 31 and section 32 are applied to the A/D converter 20 and input interface 21 and read in RAM 23. The vehicle speed and the engine speed are calculated respectively, dependent on signals from sensors 30, 31 applied to the input interface 21. Dependent on the selected transmission range signal from the range detecting section 32, it is decided that the transmission is in the hold range either the first gear hold range or the second gear hold range. At the first decision, it is determined whether the first gear hold of the first-speed drive condition is selected or not. When the first gear hold is not selected, it is determined whether the second gear hold of the second-speed drive condition is selected or not. When the second gear hold is not selected, the automatic transmission is normally operated based on the stored data in ROM 22 in accordance with the signal from the throttle position sensor 28 and the calculated vehicle speed. When the second gear hold is selected, it is further determined whether the vehicle is driven by the first-speed gear or not. When the first-speed drive condition is determined, the normal transmission operation is performed. When the first gear hold or the second gear hold at the second-speed gear ratio is determined, the engine speed is detected. When the calculated engine speed is lower than 6000 rpm, the normal transmission operation is performed. When the engine speed exceeds 6000 rpm, it is determined whether the vehicle is driven at the third-speed ratio or not. When the third-speed gear drive is not determined, the control unit 27 produces output signals for controlling the solenoid operated control valves 13 and 14 to forcibly upshift the transmission.

When the engine speed exceeds 6000 rpm at the first gear hold range, the control valves 13 and 14 are operated to upshift the transmission to the second speed drive condition. When the engine speed exceeds 6000 rpm at the second gear hold range, the transmission is upshifted to the third-speed drive condition.

In accordance with the present invention, the excessive engine speed is detected dependent on the output signal of the engine speed sensor, so that the engine speed is accurately detected and damage to the engine is exactly prevented.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A control system for an automatic transmission for a motor vehicle driven by an engine, the automatic transmission having a gear hold range, the control system comprising:

detector means for detecting a selected gear hold range and for producing a gear hold signal;

sensing means for detecting engine speed and for producing an engine speed signal dependent on engine speed;

deciding means for producing an excessive engine speed signal when the detected engine speed exceeds a predetermined speed;

control means responsive to the gear hold signal and to the excessive engine speed signal for releasing the gear hold range and for upshifting the transmission.

2. The control system according to claim 1 wherein the gear hold range includes a first gear hold range and second gear hold range.

3. The control system according to claim 1 wherein the control means includes at least one shift valve having a spool, and a solenoid operated valve for shifting the spool for holding a gear range.

* * * * *